US012693666B2

(12) United States Patent
Costa et al.

(10) Patent No.: US 12,693,666 B2
(45) Date of Patent: Jul. 28, 2026

(54) ADAPTIVE VEHICLE MOTION CONTROL SYSTEM

(71) Applicant: Aurora Operations, Inc., Pittsburgh, PA (US)

(72) Inventors: Albert Costa, Pittsburgh, PA (US); Michael L. Phillips, Pittsburgh, PA (US); Michael Bode, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/655,950

(22) Filed: May 6, 2024

(65) Prior Publication Data

US 2024/0361767 A1 Oct. 31, 2024

Related U.S. Application Data

(60) Continuation of application No. 17/344,507, filed on Jun. 10, 2021, now Pat. No. 12,007,779, which is a
(Continued)

(51) Int. Cl.
*G05D 1/00* (2024.01)
*B60W 30/095* (2012.01)
(Continued)

(52) U.S. Cl.
CPC ....... *G05D 1/0223* (2013.01); *B60W 30/0953* (2013.01); *G01C 21/3415* (2013.01);
(Continued)

(58) Field of Classification Search
None
See application file for complete search history.

(56) References Cited

U.S. PATENT DOCUMENTS 9,457,807 B2 10/2016 Lee et al.
9,494,439 B1 11/2016 Ross et al.
(Continued)

OTHER PUBLICATIONS

Wikipedia, "Autonomous Cruise Control System", retrieved on Feb. 2, 2017, https://en.wikipedia.org/wiki/Autonomous_cruise_control_system, 9 pages.

*Primary Examiner* — James M Mcpherson
(74) *Attorney, Agent, or Firm* — Dority & Manning, P.A.

(57) ABSTRACT

Systems and methods for controlling the motion of an autonomous are provided. In one example embodiment, a computer implemented method includes obtaining, by one or more computing devices on-board an autonomous vehicle, data associated with one or more objects that are proximate to the autonomous vehicle. The data includes a predicted path of each respective object. The method includes identifying at least one object as an object of interest based at least in part on the data associated with the object of interest. The method includes generating cost data associated with the object of interest. The method includes determining a motion plan for the autonomous vehicle based at least in part on the cost data associated with the object of interest. The method includes providing data indicative of the motion plan to one or more vehicle control systems to implement the motion plan for the autonomous vehicle.

20 Claims, 7 Drawing Sheets

Related U.S. Application Data division of application No. 15/963,662, filed on Apr. 26, 2018, now Pat. No. 11,036,233, which is a continuation of application No. 15/423,233, filed on Feb. 2, 2017, now Pat. No. 9,964,952.

(51) Int. Cl.

| | |
|---|---|
| *G01C 21/34* | (2006.01) |
| *G05D 1/227* | (2024.01) |
| *G05D 1/644* | (2024.01) |
| *G05D 1/65* | (2024.01) |
| *G05D 1/692* | (2024.01) |
| *G05D 1/81* | (2024.01) |

(52) U.S. Cl.

CPC ......... *G05D 1/0027* (2013.01); *G05D 1/0088* (2013.01); *G05D 1/0217* (2013.01); *G05D 1/227* (2024.01); *G05D 1/644* (2024.01); *G05D 1/65* (2024.01); *G05D 1/692* (2024.01); *G05D 1/81* (2024.01); *B60W 2554/00* (2020.02); *B60W 2554/80* (2020.02); *B60W 2720/10* (2013.01); *B60W 2754/30* (2020.02)

(56) References Cited

U.S. PATENT DOCUMENTS

| | | | |
|---|---|---|---|
| 9,821,801 | B2 | 11/2017 | Di Cairano et al. |
| 9,964,952 | B1 | 5/2018 | Costa et al. |
| 11,036,233 | B2 | 6/2021 | Costa et al. |
| 2010/0256852 | A1 | 10/2010 | Mudalige |
| 2013/0041576 | A1 | 2/2013 | Switkes et al. |
| 2014/0195093 | A1* | 7/2014 | Litkouhi ......... B60W 30/18163 |
| | | | 701/23 |
| 2016/0297438 | A1 | 10/2016 | Han |
| 2017/0120926 | A1 | 5/2017 | Yoon |
| 2017/0192437 | A1 | 7/2017 | Bier et al. |
| 2017/0293296 | A1 | 10/2017 | Stenneth et al. |
| 2017/0320491 | A1 | 11/2017 | Teller et al. |
| 2018/0001764 | A1 | 1/2018 | Bang |
| 2018/0001892 | A1 | 1/2018 | Kim et al. |
| 2018/0113448 | A1 | 4/2018 | Nagda et al. |
| 2018/0143643 | A1* | 5/2018 | Fairfield ............ G01C 21/3407 |
| 2018/0148036 | A1* | 5/2018 | Gaither ................. B60W 20/12 |
| 2018/0154899 | A1 | 6/2018 | Tiwari et al. |
| 2018/0188725 | A1 | 7/2018 | Cremona et al. |
| 2019/0283595 | A1 | 9/2019 | Koebler et al. |

* cited by examiner

800

802
OBTAIN DATA ASSOCIATED WITH ONE OR MORE OBJECTS PROXIMATE TO
VEHICLE

804
IDENTIFY AT LEAST ONE OBJECT OF INTEREST

806
GENERATE COST DATA ASSOCIATED WITH OBJECT OF INTEREST

808
DETERMININE MOTION PLAN FOR VEHICLE

810
PROVIDE MOTION PLAN TO VEHICLE CONTROL SYSTEMS

ADAPTIVE VEHICLE MOTION CONTROL SYSTEM

PRIORITY CLAIM

The present application is a continuation of U.S. application Ser. No. 17/344,507 having a filing date of Jun. 10, 2021, which is a divisional of U.S. application Ser. No. 15/963,662 having a filing date of Apr. 26, 2018, which is a continuation of U.S. application Ser. No. 15/423,233 having a filing date of Feb. 2, 2017. Applicant claims priority to and benefit of those applications and incorporates those applications herein by reference.

FIELD

The present disclosure relates generally to improved motion control of an autonomous vehicle based on objects that are proximate to the autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of controlling the motion of an autonomous vehicle. The method includes obtaining, by one or more computing devices on-board an autonomous vehicle, data associated with one or more objects that are proximate to the autonomous vehicle. The data includes a predicted path of each respective object. The method includes identifying, by the one or more computing devices, at least one object as an object of interest based at least in part on the data associated with the object of interest. The method includes generating, by the one or more computing devices, cost data associated with the object of interest. The cost data is indicative of an effect of controlling a motion of the autonomous vehicle such that the autonomous vehicle travels behind or in front of the object of interest in a manner that corresponds to a motion of the object of interest. The method includes determining, by the one or more computing devices, a motion plan for the autonomous vehicle based at least in part on the cost data associated with the object of interest. The method includes providing, by the one or more computing devices, data indicative of the motion plan to one or more vehicle control systems to implement the motion plan for the autonomous vehicle.

Another example aspect of the present disclosure is directed to a computing system for controlling the motion of an autonomous vehicle. The computing system includes one or more processors on-board an autonomous vehicle and one or more memory devices on-board the autonomous vehicle.

The one or more memory devices store instructions that when executed by the one or more processors cause the computing system to perform operations. The operations include obtaining data associated with one or more objects that are proximate to the autonomous vehicle. The data includes a predicted path of each respective object. The operations include identifying at least one object as an object of interest based at least in part on at least the data associated with the object of interest and a travel route of the autonomous vehicle. The operations include generating cost data associated with the object of interest. The cost data is indicative of an effect of controlling a motion of the autonomous vehicle such that the autonomous vehicle travels behind or in front of the object of interest in a manner that corresponds to a motion of the object of interest. The operations include outputting data indicative of the cost data associated with the object of interest.

Yet another example aspect of the present disclosure is directed to an autonomous vehicle. The autonomous vehicle include one or more vehicle control systems one or more processors on-board the autonomous vehicle, and one or more memory devices on-board the autonomous vehicle. The one or more memory devices store instructions that when executed by the one or more processors cause the one or more processors to perform operations. The operations include obtaining data associated with one or more objects that are proximate to the autonomous vehicle. The data associated with the one or more objects includes a predicted path of each respective object. The operations include identifying at least one object as a first object of interest based at least in part on the data associated with the first object of interest. The operations include generating a first set of cost data associated with the first object of interest. The first set of cost data is indicative of an effect of controlling a motion of the autonomous vehicle such that the autonomous vehicle travels behind or in front of the first object of interest. The operations include determining a motion plan for the autonomous vehicle based at least in part on the first set of cost data associated with the first object of interest. The operations include providing data indicative of the motion plan to one or more vehicle control systems to implement the motion plan for the autonomous vehicle.

Other example aspects of the present disclosure are directed to systems, methods, vehicles, apparatuses, tangible, non-transitory computer-readable media, and memory devices for controlling the motion of an autonomous vehicle.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
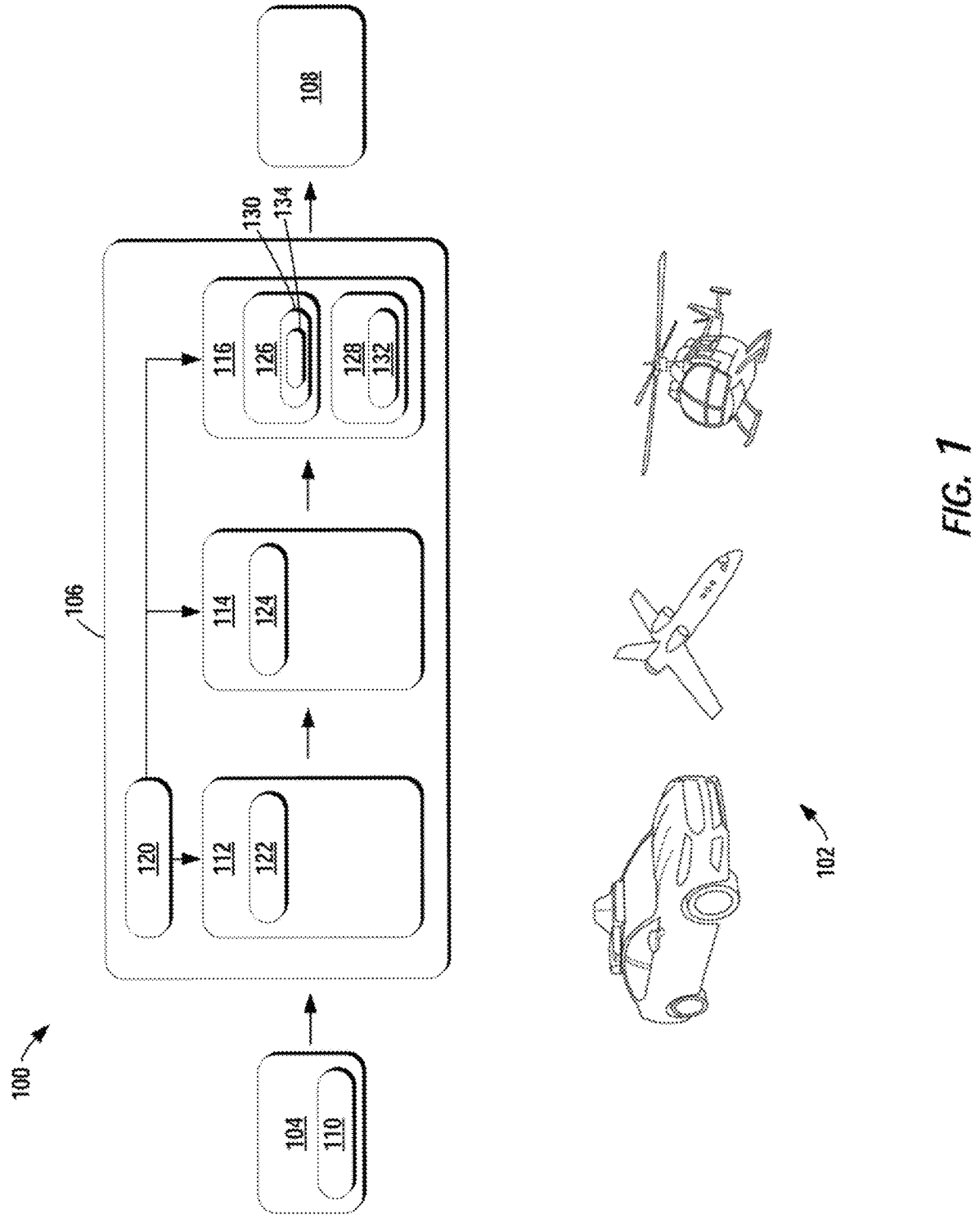
FIG. 1 depicts an example vehicle computing system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improved motion control of an autonomous vehicle based on objects that are proximate to the autonomous vehicle. For instance, an autonomous vehicle can acquire state data associated with one or more object(s) that are proximate to the autonomous vehicle (e.g., within a field of view of the vehicle's sensors). The objects can include, for example, a vehicle, a bicycle, a pedestrian, and/or other types of objects. The state data can be indicative of a current state of a respective object (e.g., speed, heading, current location). The autonomous vehicle can process the state data to determine one or more predicted future locations of each object. By way of example, the autonomous vehicle can determine a predicted path that the object (e.g., a vehicle) may follow. The autonomous vehicle can identify at least one of the objects as an object of interest based at least in part on the data associated with that object (e.g., the predicted path). For example, an object may be considered an object of interest (e.g., a primary collision risk) if the object's speed and predicted path indicate that the autonomous vehicle may eventually collide with the object given the autonomous vehicle's current and/or intended trajectory. As such, it may be potentially advantageous for the autonomous vehicle to adjust its motion to follow behind and/or travel in front of the object of interest in a manner that corresponds to the object of interest (e.g., by modulating speed to maintain a preferred following/leading distance).

To determine whether such adjustment is advantageous, the autonomous vehicle can generate cost data (e.g., a cost function) that can be used to indicate the cost of adjusting the vehicle's motion to correspond to the object of interest (e.g., to queue behind, travel in front of the object). The cost data can be specific to the object of interest and can be based at least in part on the data associated with the object of interest as well as one or more constraint(s) (e.g., headway, time to collision, minimum distance). The autonomous vehicle can determine a motion plan for the vehicle based at least in part on the cost data associated with the object of interest, as well as any other cost data (e.g., based on speed limits, traffic lights, etc.). The autonomous vehicle can implement the motion plan to cause the vehicle to autonomously travel behind or in front of the object of interest, in the event that the autonomous vehicle determines it would be advantageous (e.g., least costly) to do so. The autonomous vehicle can continue this process with multiple objects of interest (e.g., concurrently, over time) as the vehicle travels along its desired route to optimize the vehicle's motion plan. In this way, the autonomous vehicle can use this iterative optimization process to improve its ability to identify objects of interest and plan and control its motion with respect to surrounding objects. The improved motion control can further enhance passenger safety and vehicle efficiency.

More particularly, an autonomous vehicle (e.g., a ground-based vehicle, air-based vehicle, other vehicle type) can include a vehicle computing system that implements a variety of systems on-board the autonomous vehicle. For instance, the vehicle can include one or more data acquisition systems (e.g., sensors, image capture devices), an autonomy system (e.g., for determining autonomous navigation), one or more vehicle control systems (e.g., for controlling braking, steering, powertrain), etc. The data acquisition system(s) can gather sensor data (e.g., image data, radar data, lidar data) associated with one or more object(s) that are proximate to the autonomous vehicle (e.g., within a field of view of the data acquisition systems). The object(s) can include, for example, other vehicles traveling in the current travel lane of the autonomous vehicle, vehicles traveling in an adjacent travel lane, vehicles that may enter the current travel lane of the autonomous vehicle, etc. The sensor data can be indicative of characteristics (e.g., locations) associated with the object(s) at one or more times. The data acquisition system(s) can provide such sensor data to the vehicle's autonomy system.

The autonomy system can be a computing system that includes various sub-systems that cooperate to perceive the surrounding environment of the autonomous vehicle and determine a motion plan for controlling the motion of the autonomous vehicle. For instance, the autonomy system can include a perception system, a prediction system, and a motion planning system.

The perception system can process the sensor data from the data acquisition system(s) to detect the one or more objects that are proximate to the autonomous vehicle as well as state data associated therewith. The state data for each object can describe an estimate of the object's current location (also referred to as position), current speed/velocity, current acceleration, current heading, current orientation, size/footprint, class (e.g., vehicle class vs. pedestrian class vs. bicycle class), and/or other state information. As described herein, the objects can include vehicles, bicycles, pedestrians, and/or other objects. The perception system can output data indicative of the state data for each object to the prediction system.

The prediction system can create predicted data associated with one or more of the objects. The predicted data can be indicative of one or more predicted future locations of each respective object. In particular, the predicted data can indicate a predicted path associated with each object. The predicted path can be indicative of a trajectory along which the respective object is predicted to travel over time (and/or the speed at which the object is predicted to travel along the predicted path). The prediction system can provide the predicted data associated with the one or more objects to the motion planning system.

The motion planning system can include various components for planning the motion of the autonomous vehicle. For instance, the motion planning system can include an improved adaptive cruise control component and an optimization component. The adaptive cruise control component can be configured to identify an object of interest and generate cost data associated with the object of interest. The optimization component can evaluate such cost data as well as any other cost data (e.g., based on speed limits, traffic lights) to determine an optimal motion plan for the autonomous vehicle.

For instance, the motion planning system can identify at least one object of interest based at least in part on the data associated with the object of interest (e.g., predicted data) and/or a desired route to be travelled by the autonomous vehicle. The object of interest can be an object for which the autonomous vehicle should consider when controlling and/ or adjusting its motion (e.g., to slow down). For example, the object of interest can be a primary collision risk object with which the autonomous vehicle may eventually collide given the speed of the object, the predicted path of the object, and/or the travel route of the autonomous vehicle (e.g., current and/or planned future route). In some implementations, the object of interest can be the object which is currently closest to the autonomous vehicle. In some implementations, the object of interest can be the first object the vehicle will approach or interact with given the object's predicted path and the vehicles travel route. In some implementations, the object of interest can be located (e.g., behind or in front of) the autonomous vehicle in a current travel lane of the autonomous vehicle. In some implementations, the object of interest can be associated with a predicted path that indicates the object of interest is to merge into the vehicle's current travel lane (e.g., via merging area, at an intersection). In some implementations, the motion planning system can identify the object of interest based at least in part on object class (e.g., to identify a car instead of a pedestrian). In some implementations, the motion planning system can identify more than one object of interest. For example, in the event that the autonomous vehicle intends to change lanes, the motion planning system can identify a first object of interest in the current travel lane of the autonomous vehicle and a second object of interest in another travel lane (e.g., a vehicle traveling in the adjacent lane).

The motion planning system can generate cost data associated with each object of interest. The cost data can be indicative of a potential effect of controlling a motion of the autonomous vehicle such that the autonomous vehicle travels (e.g., behind or in front of the object of interest) in a manner that corresponds to a motion of the object of interest. The motion planning system can determine (e.g., in real, near-real time) a separate cost function for each object of interest while the vehicle is traveling. The cost function can be indicative of a cost (e.g., over time) of controlling the motion of the autonomous vehicle (e.g., the trajectory, speed, or other controllable parameters of the autonomous vehicle) to correspond to the motion of the object of interest (e.g., to travel behind the object). For example, the cost described by a cost function can increase when the autonomous vehicle would strike another object, deviate from a preferred pathway, consume additional resources, violate traffic laws, etc.

The cost data can be based on one or more constraints. The constraint(s) can include, for example, a preferred headway (e.g., time gap) between the autonomous vehicle and the object of interest, a time to a potential collision between the autonomous vehicle and the object of interest, and/or a minimum preferred distance between the autonomous vehicle and the object of interest. The constraint(s) can be pre-set and/or dynamically adjusted (e.g., by the vehicle computing system) while the autonomous vehicle is traveling. At least a subset of the predicted data associated with the object of interest (e.g., predicted path, speed) and/or the travel route of the autonomous vehicle can be used as inputs to the cost function.

The motion planning system can determine a motion plan for the autonomous vehicle based at least in part on the cost data associated with the object of interest. For example, the motion planning system can implement an optimization algorithm that considers the cost function associated with the object of interest as well as other cost functions to determine optimized variables that make up the motion plan. In the event that it is advantageous (e.g., less, least costly) for the autonomous vehicle to travel in a manner that corresponds to the object of interest, the motion planning system can determine a motion plan accordingly. For example, the motion plan can include a trajectory by which the autonomous vehicle is to travel behind (or in front of) the object of interest with at least a minimum distance between the autonomous vehicle and the object of interest. The motion plan can also, or alternatively, include a following distance that is determined at least in part from the state of the autonomous vehicle (e.g., current speed, location, travel route) and the state of the object of interest. The following distance is preferably greater than or equal to the minimum preferred distance described herein. The motion plan can modulate the speed of the autonomous vehicle such that the autonomous vehicle maintains the determined following distance between it and the object of interest. In this way, the motion planning system can control the motion of the autonomous vehicle with respect to surrounding objects of interest.

The systems, methods, and vehicles described herein may provide a number of technical effects and benefits. For instance, the vehicle computing system can locally (e.g., on-board the vehicle) detect an object, evaluate its importance to the motion of the vehicle, and adjust the motion of the vehicle accordingly. Moreover, the autonomous vehicle can perform this process on multiple objects at the same time. The vehicle computing system can be configured to continuously perform this iterative optimization process as the vehicle travels and different objects become proximate to the autonomous vehicle. As such, the vehicle computing system can proactively control the motion of the autonomous vehicle to avoid sudden movements (e.g., rapid deceleration) that place stress on the vehicle's systems and confuse or frighten users (e.g., passengers of the vehicle). This can help to improve the safety of the autonomous vehicle and its users.

The systems, methods, and vehicles described herein also provide an improvement to vehicle computing technology, such as autonomous vehicle computing technology. For instance, aspects of the present disclosure enable a vehicle computing system to more efficiently and accurately control the vehicle's motion. For example, the systems, methods, and vehicles of the present disclosure can allow one or more computing devices on-board an autonomous vehicle to obtain data associated with one or more objects that are proximate to the autonomous vehicle. The data can include a predicted path of each respective object. The predicted path can be more than a binary determination that the object is or could be proximate to the vehicle in the future. Thus, the predicted path can allow the vehicle to more accurately identify the most appropriate objects for planning vehicle motion.

The computing device(s) can identify at least one object as an object of interest based at least in part on the data associated with the object of interest. By focusing the application of the optimization process described herein to object(s) of interest (rather than all detected objects), the autonomous vehicle can select the most appropriate objects for planning vehicle motion. Moreover, the on-board computing device(s) can save valuable processing and memory resources that can be allocated to other important vehicle tasks (e.g., fault monitoring, fault diagnosis).

The computing device(s) can generate cost data (e.g., a cost function) associated with the identified object(s) of interest. The cost data can be indicative of an effect (e.g., cost) of controlling a motion of the autonomous vehicle such that the autonomous vehicle travels behind or in front of the object of interest in a manner that corresponds to a motion of the object of interest. The inputs of the cost data can include at least the data associated with the object of interest. Accordingly, the computing devices of the autonomous vehicle can specifically tailor individual cost data (e.g., a cost function) for each object of interest. This can allow for a more refined determination of the costs associated with controlling vehicle motion based on the particular object of interest.

The computing device(s) can determine a motion plan for the autonomous vehicle based at least in part on the cost data associated with the object of interest. The computing device(s) can provide data indicative of the motion plan to one or more vehicle control systems to implement the motion plan for the autonomous vehicle. In this way, the systems, methods, and vehicles described herein can improve the ability of the vehicle computing system to locally and proactively plan the motion of the vehicle to account for the objects in the vehicle's surroundings that are most critical to the vehicle's motion. Accordingly, the systems, methods, and vehicles improve the ability of the vehicle computing system to efficiently and accurately control vehicle motion, while increasing overall safety.

With reference now to the FIGS., example embodiments of the present disclosure will be discussed in further detail. FIG. 1 depicts an example vehicle computing system 100 of a vehicle 102 according to example embodiments of the present disclosure. The vehicle 102 incorporating the vehicle control system 100 can be a ground-based autonomous vehicle (e.g., car, truck, bus), an air-based autonomous vehicle (e.g., airplane, drone, helicopter, or other aircraft), or other types of vehicles (e.g., watercraft). The vehicle 102 can be an autonomous vehicle that can drive, navigate, operate, etc. with minimal and/or no interaction from a human driver. For example, the vehicle 102 can be configured to operate in one or more modes such as, for example, a fully autonomous operational mode and/or a semi-autonomous operational mode. A fully autonomous (e.g., self-driving) operational mode can be one in which the autonomous vehicle can provide driving and navigational operation with no interaction from a human driver. A semi-autonomous operational mode can be one in which the autonomous vehicle can operate with some interaction from a human driver present in the vehicle. In some implementations, the vehicle 102 can be associated with an entity (e.g., a service provider) that provides one or more vehicle services to a plurality of users via a fleet of vehicles that includes, for example, the vehicle 102. The vehicle services can include transportation services (e.g., rideshare services), courier services, delivery services, and/or other types of services.

The vehicle 102 can include one or more data acquisition systems 104, one or more computing device(s) 106, and one or more vehicle control systems 108. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The data acquisitions system(s) 104 can be configured to obtain sensor data 110 associated with one or more objects that are proximate to the vehicle 102 (e.g., within a field of view of one or more of the data acquisition system(s) 104). The data acquisitions system(s) 104 can include a Light Detection and Ranging (LIDAR) system, a Radio Detection and Ranging (RADAR) system, one or more cameras (e.g., visible spectrum cameras, infrared cameras, etc.), motion sensors, and/or other types of image capture devices and/or sensors. The sensor data 110 can include image data, radar data, lidar data, and/or other data acquired by the data acquisitions system(s) 104. The object(s) can include, for example, vehicles, bicycles, pedestrians, and/or other objects. The object(s) can include, for example, other vehicles traveling in the current travel lane of the autonomous vehicle, vehicles traveling in an adjacent travel lane, vehicles that may enter the current travel lane of the autonomous vehicle, etc. The objects can include pedestrians (e.g., traveling on an adjacent sidewalk), as well as stationary objects (e.g., parked cars). The sensor data 110 can be indicative of characteristics (e.g., locations) associated with the object(s) within the surrounding environment of the vehicle 102 at one or more times. The data acquisition system(s) 104 can provide such sensor data 110 to the computing device(s) 106.

In addition to the sensor data 110, the computing device(s) 106 can retrieve or otherwise obtain map data 120 associated with the surroundings of the vehicle 102. The map data 120 can provide detailed information about the surrounding environment of the vehicle 102. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or the boundary marking associated therewith); traffic control data (e.g., the location and instructions of signage, traffic lights, or other traffic control devices); and/or any other map data that provides information that assists the vehicle 102 in comprehending and perceiving its surrounding environment and its relationship thereto.

The computing device(s) 106 can be associated with and/or implement an autonomy computing system of the vehicle 102 and can assist in controlling the vehicle 102. The autonomy computing system can include a perception system 112, a prediction system 114, and a motion planning system 116 that cooperate to perceive the surrounding environment of the vehicle 102 and determine a motion plan for controlling the motion of the vehicle 102 accordingly. The computing device(s) 106 can be configured to implement these systems. For example, computing device(s) 106 can receive the sensor data 110 from the data acquisition system(s) 104, attempt to comprehend the surrounding environment by performing various processing techniques on data collected by the data acquisition system(s) 104, and generate an appropriate motion plan through such surrounding environment. The computing device(s) 106 can control the one or more vehicle control systems 108 to operate the vehicle 102 according to the motion plan.

The computing device(s) 106 can identify one or more objects that are proximate to the vehicle 102 based at least in part on the sensor data 110 and/or the map data 120. For example, the computing device(s) 106 can obtain (e.g., via the perception system 112) state data 122 descriptive of a current state of an object that is proximate to the vehicle 102. The state data 122 for each object can describe, for example, an estimate of the object's: current location (also referred to as position); current speed (also referred to as velocity); current acceleration, current heading; current orientation; size/footprint (e.g., as represented by a bounding polygon); class (e.g., pedestrian class vs. vehicle class vs. bicycle class), and/or other state information.

The computing device(s) 106 (e.g., the prediction system 114) can create predicted data 124 associated with each of the respective one or more objects proximate to the vehicle 102. The predicted data 124 can be indicative of one or more predicted future locations of each respective object. The predicted data 124 can indicate a predicted path (e.g., trajectory) along which the respective object is predicted to travel over time (and/or the speed at which the object is predicted to travel along the predicted path). The prediction system 114 can provide the predicted data 124 associated with the object(s) to the motion planning system 116.

The motion planning system 116 can include various components for planning the motion of the vehicle 102. For instance, the motion planning system 116 can include an adaptive cruise control component 126 and an optimization component 128. The adaptive cruise control component 126 can be configured to identify an object of interest and generate cost data 130 associated with the object of interest. The optimization component 128 can evaluate the cost data 130 as well as any other cost data (e.g., based on speed limits, traffic lights) to determine a motion plan 132 for the vehicle 102.

For instance, the computing device(s) 106 (e.g., the adaptive cruise control component 126 of the motion planning system 116) can obtain data associated with one or more objects that are proximate to the vehicle 102. Such data can include the predicted data 124 that includes one or more predicted future locations of each respective object, a predicted path of each respective object, a predicted speed of each respective object, etc.

Figure 2:
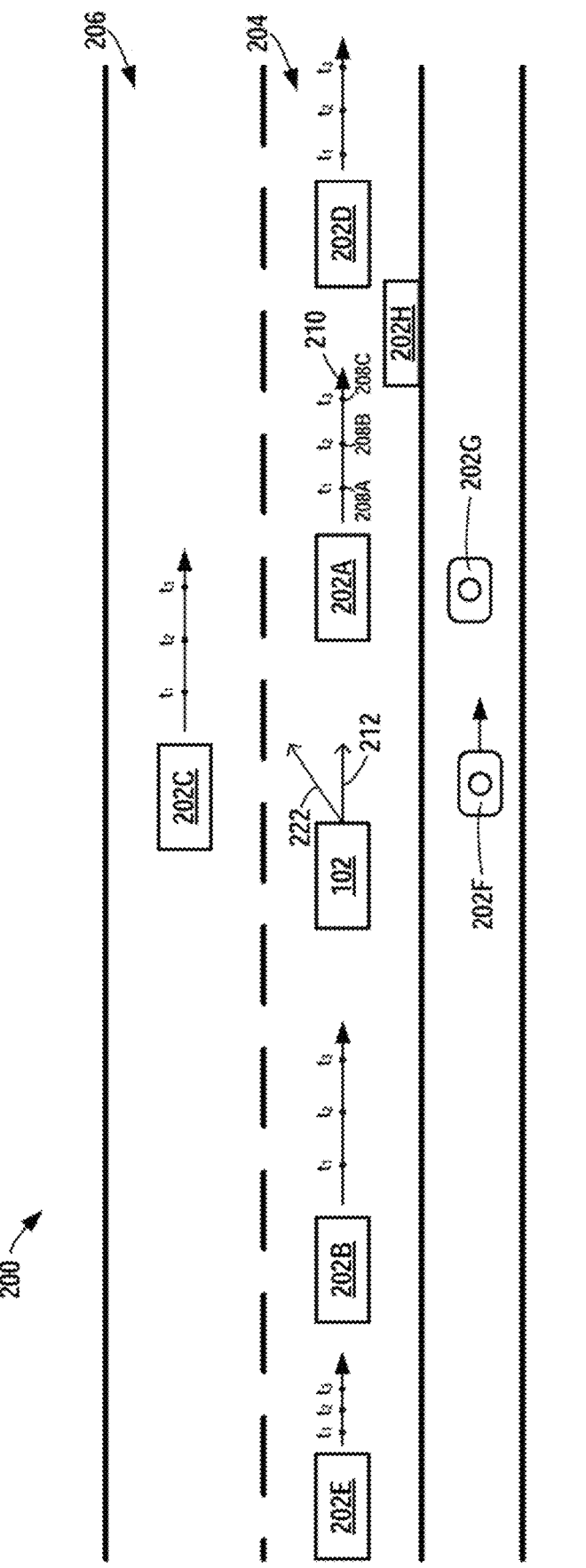
FIG. 2 depicts a graphical diagram of an example travel way according to example embodiments of the present disclosure.

For example, FIG. 2 depicts a graphical diagram of example travel way 200 according to example embodiments of the present disclosure. As shown, the computing device(s) 106 (e.g., the perception system 112) can identify a plurality of objects 202A-H that are proximate to the vehicle 102 (e.g., within a field of view of one or more of the data acquisition systems 104). The object(s) 202A-E can be another vehicle, bicycle, etc. An object 202A can be located in front of and/or in a current travel lane 204 of the vehicle 102. Additionally, or alternatively, an object 202B can be located behind (to the rear of) the vehicle 102 in the current travel lane 204. In some implementations, an object 202C can be located in another travel lane 206 (e.g., an adjacent travel lane) that is different from the current travel lane 204. An object located in the other travel lane 206 can be located adjacent to (to the side of) the vehicle 102, in front of the vehicle 102, and/or behind (to the rear of) the vehicle 102.

The computing device(s) 106 can identify objects that are directly in front of, behind, or to the side of the vehicle 102, as well as objects positioned in different manners. For example, the computing device(s) 106 (e.g., the perception system 112) can analyze the sensor data 110 to identify objects 202D-E that are not directly in front of, behind, or to the side of the vehicle 102. Rather, there are other objects that are located between objects 202D-E and the vehicle 102. For example, the computing device(s) 106 can identify object 202D within the vehicle's surroundings (e.g., to the front of the vehicle 102), despite the positioning of the object 202A between the vehicle 102 and the object 202D. Additionally, or alternatively, the computing device(s) 106 can identify object 202E within the vehicle's surroundings (e.g., to the rear of the vehicle 102), despite the positioning of the object 202B between the vehicle 102 and the object 202E.

The computing device(s) 106 (e.g., the perception system 112) can identify objects that are in motion and/or objects that are static. For example, the computing device(s) 106 can identify objects 202A-B (e.g., other vehicles) that are traveling in the travel way 200. The computing device(s) 106 can also identify objects 202F in the vehicle's surroundings that are in motion, but are not traveling in the travel way 200 (e.g., a pedestrian walking on a sidewalk). The computing device(s) 106 can also identify objects that are static (e.g., not in motion). A static object 202G (e.g., a pedestrian standing on a sidewalk) can be located outside of the current travel way 200 (and/or current travel lane 204) of the vehicle 102. A static object 202H (e.g., a parked vehicle) can be located within the current travel way 200 (and/or current travel lane 204) as the vehicle 102.

The computing device(s) 106 (e.g., the perception system 112) can assign an object class to each respective object of the plurality objects 202A-H. For example, the computing device(s) 106 can assign a pedestrian class to objects 202F-G. The computing device(s) 106 can assign a vehicle class to objects 202A-E, H. As described herein, the state data 122 can include the object class of each object.

The computing device(s) 106 (e.g., the prediction system 114) can determine predicted data 124 for each respective object. The predicted data 124 can be based at least in part on the state data 122. For example, the computing device(s) 106 can determine one or more predicted future locations 208A-C at one or more times (e.g., $t_1$, $t_2$, $t_3$) for an object 202A based at least in part on the state data 122. Moreover, the predicted data 124 for each object can include a predicted path (e.g., trajectory) along which the respective object is predicted to travel over time (and/or the speed at which the object is predicted to travel along the predicted path). For example, the computing device(s) 106 can determine a predicted path 210 for the object 202A based at least in part on the state data 122 associated with the object 202A (e.g., based at least in part on the object's heading, speed, location, etc. at one or more times). The predicted path 210 can be based at least in part on the class of object. For example, the predicted path 210 for the object 202A (e.g., a vehicle, bicycle traveling on a roadway) may be different than that associated with the object 202F (e.g., a pedestrian traveling on a sidewalk).

In some implementations, the computing device(s) 106 can filter out the static objects 202G-H such that no predicted path is determined for the static objects 202G-H. In some implementations, the computing device(s) 106 can generate predicted data 124 for the static objects 202G-H. The predicted data 124 can indicate, for example, that the static objects 202G-H are predicted to remain stationary. In some implementations, the predicted data 124 can indicate that an object that is currently static may begin to move along a predicted path.

The computing device(s) 106 (e.g., the adaptive cruise control component 126) can identify at least one object as an object of interest. The object of interest can be a primary collision risk object with which the vehicle 102 may eventually collide given the speed of the object, the predicted path of the object, and/or the travel route of the vehicle 102 (e.g., current and/or planned future route). Additionally, or alternatively, the object of interest can be the object for which it is most appropriate (e.g., safest, most efficient) for the vehicle 102 to consider when controlling and/or adjusting its motion.

The computing device(s) 106 can identify the object of interest based on various types of data. For example, the computing device(s) 106 can identify at least one object as an object of interest based at least in part on at least a subset of the data associated with the object of interest (e.g., the predicted data 124 for that object). For example, the computing device(s) 106 can identify an object as an object of interest based at least in part on the predicted path (and/or predicted future location(s)) associated with the object. Additionally, or alternatively, the computing device(s) 106 can identify an object as an object of interest based at least in part on other information such as, for example, a travel route 212 of the vehicle 102 (e.g., current, intended, future planned trajectory, speed of the vehicle 102), the map data 120, and/or other information.

The computing device(s) 106 (e.g., the adaptive cruise control component 126) can select the most appropriate object for planning vehicle motion. For instance, the computing device(s) 106 can identify an object as the object of interest based at least in part on the travel lane position of the object. By way of example, as shown in FIG. 2, an object 202A can be located in front of the vehicle 102 in the current travel lane 204 of the vehicle 102. As such, the computing device(s) 106 can identify the object 202A as the object of interest because the object is located in front of the vehicle 102, while in the current travel lane 204, thus making the object 202A highly relevant to the motion of the vehicle 102 in the current travel lane 204. Additionally, or alternatively, an object 202B can be located behind the vehicle 102 in the current travel lane 204 of the vehicle 102. As such, the computing device(s) 106 can identify the object 202B as the object of interest because the object is in the current travel lane 204 and traveling to the rear of the vehicle 102, thus making the object 202B highly relevant to the motion of the vehicle 102 while in the current travel lane 204.

Additionally, or alternatively, the computing device(s) 106 can identify an object as the object of interest based at least in part on a distance between the vehicle 102 and the object. For instance, the object of interest can be the object which is currently closest in distance to the vehicle 102 and/or will be the object which is closest in distance to the vehicle 102. By way of example, with reference to FIG. 2, the computing device(s) 106 can determine that the object 202A is located closest to the vehicle 102. Moreover, the computing device(s) 106 can determine that the object 202A is likely to remain the closest object (e.g., non-static object)

to the vehicle 102 based at least in part on the predicted path 210 of the object 202A (and/or the travel route 212 of the vehicle 102). Accordingly, the computing device(s) 106 can identify the object 202A as the object of interest that is most appropriate for planning the motion of the vehicle 102.

Figure 3:
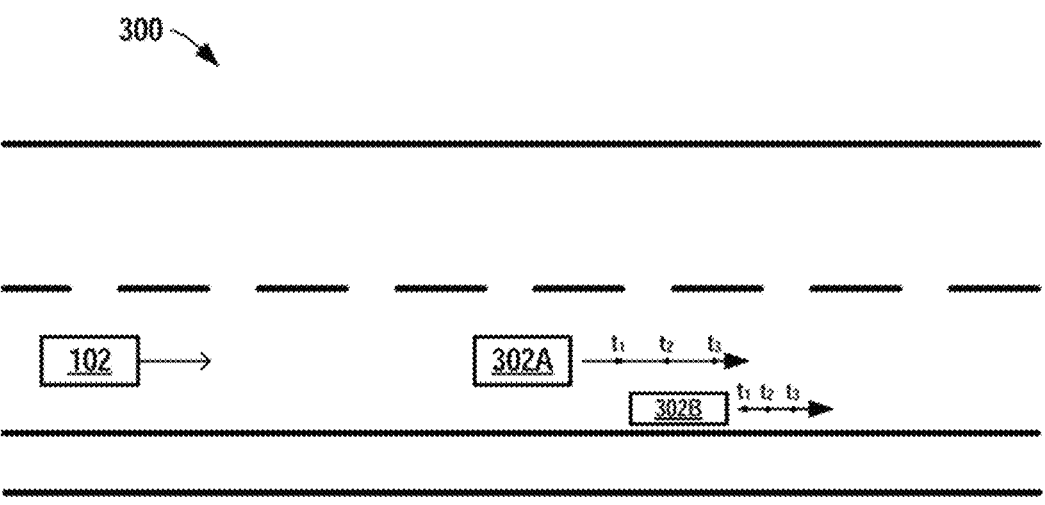
FIG. 3 depicts a graphical diagram of another example travel way according to example embodiments of the present disclosure.

Additionally, or alternatively, the computing device(s) 106 can identify an object as an object of interest based at least in part on the speed (e.g., current speed, predicted speed) of the particular object and/or one or more other objects within the vehicle's surrounding environment. For instance, FIG. 3 depicts a graphical diagram of another example travel way 300 according to example embodiments of the present disclosure. The computing device(s) 106 (e.g., the perception system 112) can detect two objects 302A-B (e.g., non-static objects) in the surrounding environment of the vehicle 102. The object 302A can be traveling at a rate of speed that is greater than the rate of speed at which the object 302B is traveling. As such, the vehicle 102 may approach the object 302B before the object 302A and/or the object 302A may soon pass the object 302B. The computing device(s) 106 can identify the object 302B as the object of interest so that the vehicle 102 can plan its motion to remain behind the object 302B (e.g., the slower moving object).

Additionally, or alternatively, the computing device(s) 106 can identify at least one object as the object of interest based at least in part on an object class associated with the object of interest. As described herein, the data associated with the one or more objects within the vehicle's surroundings (e.g., the state data 122) can be indicative of an object class for each respective object of the plurality of objects. For example, with reference to FIG. 3, the computing device(s) 106 can select a vehicle class for the object 302A and/or a bicycle class for the object 302B. The computing device(s) 106 can identify the object 302A (e.g., the vehicle) as the object of interest because it may be more appropriate to plan the motion of the vehicle 102 based on another vehicle that will be traveling in a similar manner to that of the vehicle 102 (e.g., traveling along a predicted path associated with a vehicle).

Figure 4:
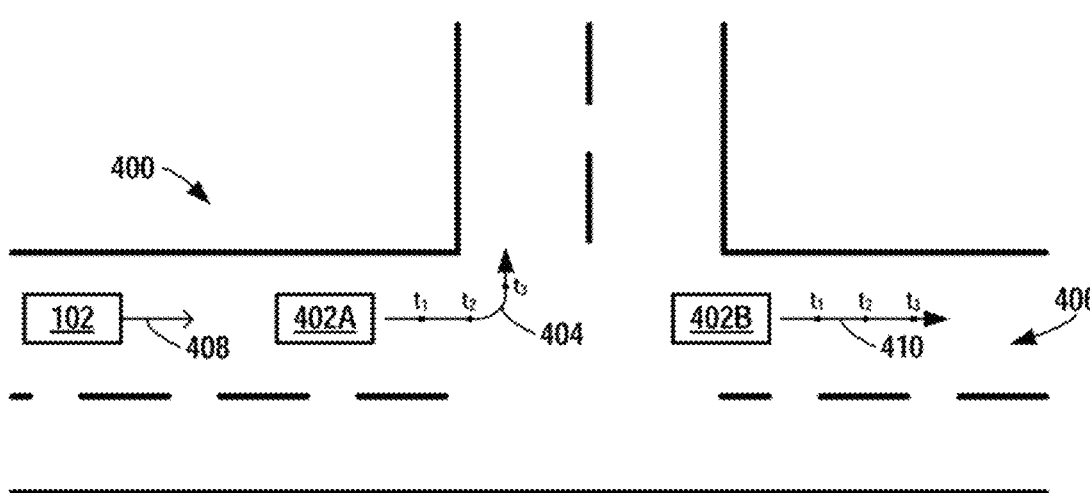
FIG. 4 depicts a graphical diagram of another example travel way and objects according to example embodiments of the present disclosure.

Additionally, or alternatively, the computing device(s) 106 can identify an object of interest based at least in part on the predicted path of the object relative to a current travel lane of the vehicle 102. For instance, FIG. 4 depicts a graphical diagram of another example travel way 400 according to example embodiments of the present disclosure. The computing device(s) 106 can detect the objects 402A-B within the surrounding environment of the vehicle 102. The computing device(s) 106 can determine a predicted path 404 of the object 402A that indicates the object 402A is likely to exit the current travel lane 406 of the vehicle 102. For example, the predicted path 404 predicts that the object 402A will turn at the intersection shown in FIG. 4. The vehicle 102 may have travel route 408 that does not indicate the vehicle 102 is to turn at the intersection, but rather is to proceed straight in the current travel lane 406. The predicted path 410 can indicate that the object 402B is predicted to continue traveling straight in the current travel lane 406. Accordingly, the computing device(s) 106 can identify the object 402B as the object of interest for planning the motion of the vehicle 102.

Figure 5:
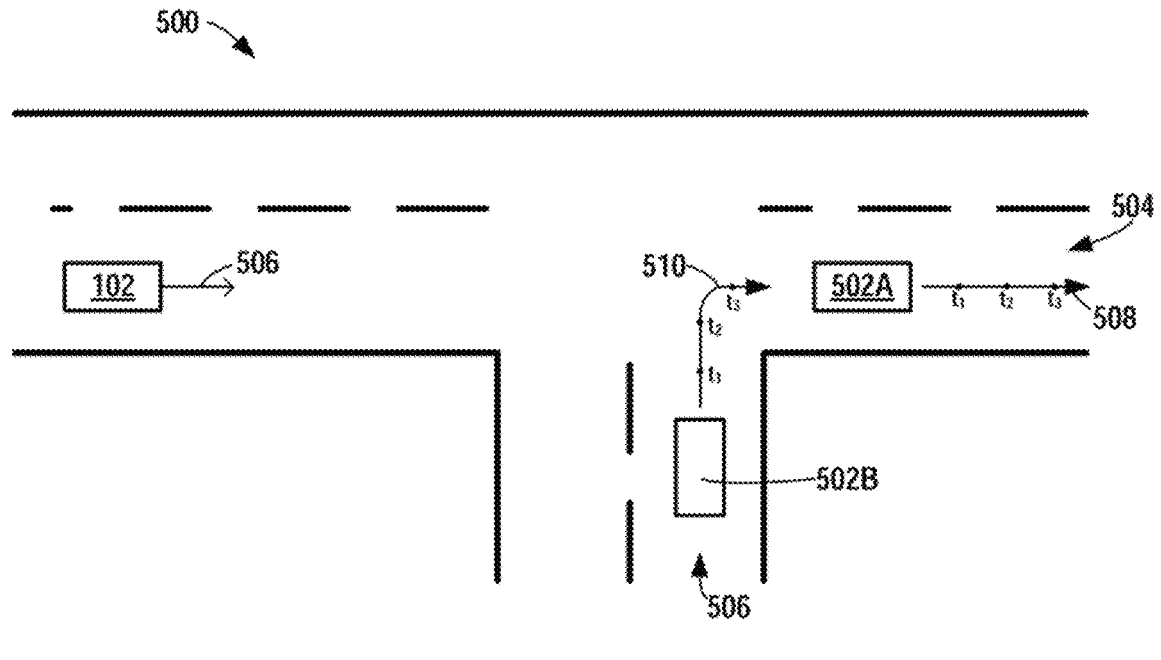
FIG. 5 depicts a graphical diagram of another example travel way according to example embodiments of the present disclosure.

Additionally, or alternatively, the object of interest can be an object that is predicted to enter into a current travel lane of the vehicle 102. FIG. 5 depicts a graphical diagram of another example travel way 500 according to example embodiments of the present disclosure. The computing device(s) 106 can detect the objects 502A-B within the surrounding environment of the vehicle 102. The vehicle 102 can be traveling in a current travel lane 504 according to a travel route 506. The travel route 506 of the vehicle 102 can indicate that the vehicle 102 is to travel through an intersection. The object 502A can be located in and/or traveling in the current travel lane 504. The object 502B can be located and/or traveling in a travel lane 506 that merges toward and/or intersects with the current travel lane 504 of the vehicle 102.

The computing device(s) 106 (e.g., the prediction system 114) can determine a predicted path 508 of the object 502A and a predicted path 510 of the object 502B. The predicted path 508 of the object 502A can indicate that the object 502A is predicted to travel straight in the current travel lane 504. The predicted path 508 of the object 502A can indicate that the object 502A is predicted to travel through the intersection and/or to merge into the current travel lane 504 of the vehicle 102. The computing device(s) 106 can identify the object 502B (e.g., the object turning right) as the object of interest because the vehicle 102 is more likely to approach and/or interact with the object 502B before interacting with the object 502A that is already in the current travel lane 504 based on the vehicle's travel route 506 and the predicted path 510 of the object 502B.

Figure 6:
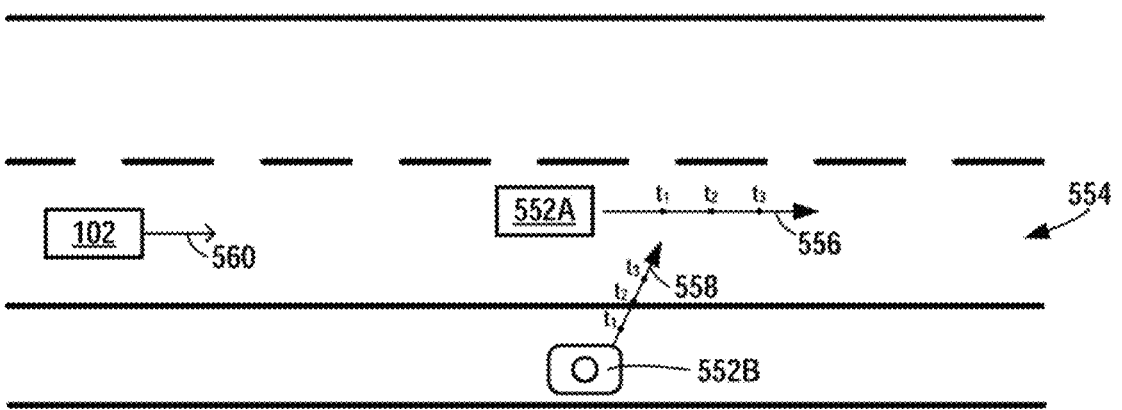
FIG. 6 depicts a graphical diagram of another example travel way according to example embodiments of the present disclosure.

The object of interest can be an object other than a vehicle. For instance, FIG. 6 depicts a graphical diagram of another example travel way 550 according to example embodiments of the present disclosure. The computing device(s) 106 can detect the objects 552A-B within the surrounding environment of the vehicle 102. The object 552A can be a vehicle (or bicycle) traveling in the current travel lane 554 of the vehicle 102. The object 552B can be a pedestrian. The computing device(s) 106 can determine a predicted path 556 of the object 552A and a predicted path 558 of the object 552B. The vehicle 102 can be traveling in the current travel lane 554 according to a travel route 560. The predicted paths 556-558 can indicate that the object 552B (e.g., the pedestrian) is to travel in front of the vehicle 102 (in the lane 554) after the object 552A (e.g., the vehicle) passes the object 552B. In this example, while the object 552A (e.g., the vehicle) is located in front of the vehicle 102 (and may currently be the closest object to the vehicle 102), the computing device(s) 106 can identify the object 552B (e.g., the pedestrian) as the object of interest for controlling the vehicle's motion (e.g., to ultimately slow down the vehicle 102 since the pedestrian is not moving at the speed of traffic). Such an example also illustrates that it can be advantageous for the vehicle 102 to identify multiple objects (e.g., using the process described herein) when determining the motion of the vehicle 102.

The descriptive above discusses various criteria for selecting an object of interest that is proximate to the vehicle. The criteria are not meant to be limiting, as additional criteria can be utilized within the scope of the present disclosure. Moreover, the object of interest can be identified based on a combination of any of these criteria.

Returning to FIG. 1, the computing device(s) 106 (e.g., the motion planning system 116) can plan the motion of the vehicle 102 based at least in part on the identified object of interest. For instance, the computing device(s) 106 can generate (e.g., in real, near-real time) cost data 130 associated with an object of interest. The cost data 130 can be indicative of an effect of controlling a motion of the vehicle 102 such that the vehicle 102 travels behind (or in front of) the object of interest in a manner that corresponds to a motion of the object of interest. For example, the computing device(s) 106 can determine (e.g., in real, near-real time) a separate cost function for each object of interest while the vehicle 102 is traveling. A cost function can be indicative of a cost (e.g., over time) of controlling the motion of the vehicle 102 (e.g., the trajectory, speed, or other controllable parameters of the vehicle) to correspond to the motion of the object of interest (e.g., to travel behind the object). For example, the cost described by a cost function can increase when the vehicle 102 would strike another object, deviate from a preferred pathway, consume additional resources, violate traffic laws, etc. One or more inputs of the cost data (e.g., cost function) can include, for example, at least a subset of the data associated with the object of interest (e.g., the predicted data 124, the state data 122) and/or the travel route of the vehicle 102.

The cost data 130 can be based at least in part on one or more constraints 134. The one or more constraints 134 can include, for example, one or more of a headway between the vehicle 102 and the object of interest (e.g., expressed as a time gap), a time to a potential collision between the vehicle 102 and the object of interest, and a minimum preferred distance between the vehicle 102 and the object of interest (e.g., expressed as a distance), and/or other constraints.

The constraint(s) 134 can be dynamically adjustable while the vehicle 102 is traveling. For example, one or more remote computing device (e.g., associated with a central operations system, a service provider) can identify updated, modified, or new constraints for use in generating the cost data. By way of example, a service provider associated with a fleet of vehicles (including the vehicle 102) may decide that the required headway between the vehicle 102 should be adjusted from a 2-3 second time gap to 4-5 seconds. Accordingly, the remote computing device(s) can send data indicated of the updated, modified, or new constraints to the vehicle 102. The computing device(s) 106 can dynamically adjust the constraints 134 to reflect the updated, modified, or new constraints, while the vehicle 102 is traveling.

Additionally, or alternatively, computing device(s) 106 can adjust the constraints 134 on-board the vehicle 102 without communication with a remote computing device. For example, the computing device(s) 106 can determine that the vehicle 102 has entered into a different geographic area (e.g., including a travel way with a higher speed limit) based on the location of the vehicle 102 and/or the map data 120. The computing device(s) 106 can determine that the required headway between the vehicle 102 should be increased in light of the higher possible rate of travel. The computing device(s) 106 can adjust the constraint(s) 134 accordingly.

The computing device(s) 106 (e.g., the adaptive cruise control component 126) can output data indicative of the cost data 134 associated with the object of interest (e.g., to the optimization component 128) and determine a motion plan 132 accordingly. For example, the computing device(s) 106 (e.g., the optimization component 128) can determine a motion plan 132 for the vehicle 102 based at least in part on the cost data 130 associated with the object of interest. The computing device(s) 106 (e.g., the optimization component 128) can implement an optimization algorithm that considers the cost data (e.g., cost function) associated with an identified object of interest as well as other cost functions (e.g., based on speed limits, traffic lights, etc.) to determine optimized variables that make up the motion plan 132. In the event that it is advantageous (e.g., less, least costly) for the vehicle 102 to travel in a manner that corresponds to the object of interest, the computing device(s) 106 can determine a motion plan 132 accordingly.

The motion plan 132 can include information for controlling the motion of the vehicle 102. For example, the motion plan 132 can include, for example, a trajectory by which the vehicle 102 is to travel behind the object of interest and/or a trajectory by which the vehicle 102 is to travel in front of the object of interest. Moreover, the motion plan 132 can include a distance between the vehicle 102 and the object of interest. The motion plan 132 can be indicative of a modulation of the speed of the vehicle 102 such that the vehicle 102 maintains at least the distance between the vehicle 102 and the object of interest.

The computing device(s) 106 can provide data indicative of the motion plan 132 to one or more vehicle control systems 108 to implement the motion plan 132 for the vehicle 102. For instance, the vehicle 102 can include a mobility controller configured to translate the motion plan 132 into instructions. By way of example, the mobility controller can translate a determined motion plan into instructions to adjust the steering of the vehicle 102 "X" degrees, apply 10% braking force, etc. The mobility controller can send one or more control signals to the vehicle control components (e.g., braking control component, steering control component) to execute the instructions (to implement the motion plan).

Figure 7:
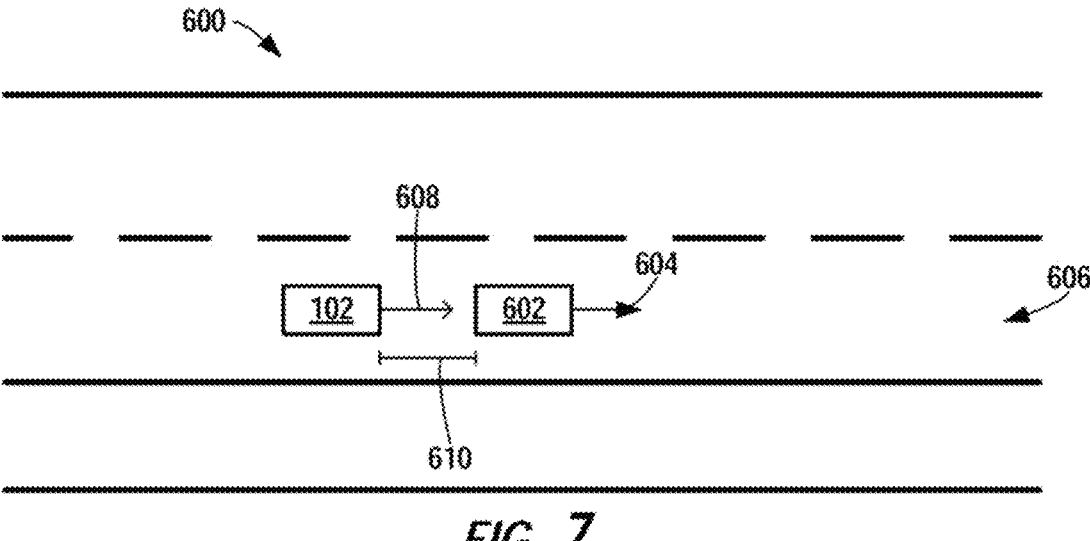
FIG. 7 depicts a graphical diagram of another example travel way according to example embodiments of the present disclosure.

Implementation of the motion plan 132 can cause the vehicle 132 to travel in a manner that corresponds to the motion of the object of interest. For example, as shown in the travel way 600 of FIG. 7, the vehicle 102 can travel behind an object of interest 602 (e.g., a lead vehicle) in a manner that corresponds to the motion of the object of interest 602 (e.g., as shown by motion vector 604). The vehicle control system(s) 108 can control the motion of the vehicle 102 to travel behind an object of interest 602 (e.g., within the travel lane 606) by maintaining the planned trajectory 608. Additionally, or alternatively, the vehicle control system(s) 108 can modulate the speed of the vehicle 102 to maintain at least a gap 610 (e.g., a distance, headway) between the vehicle 102 and the object of interest 602.

Figure 8:
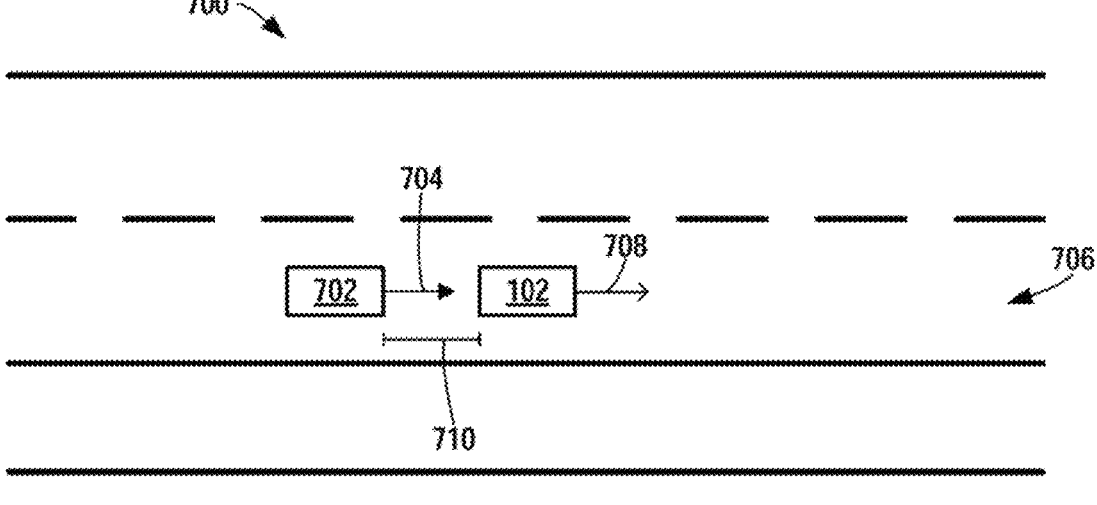
FIG. 8 depicts a graphical diagram of another example travel way according to example embodiments of the present disclosure.

Additionally, or alternatively, implementation of the motion plan 132 can cause the vehicle 132 to travel behind (to the rear of) an object of interest in the manner that corresponds to the motion of the object of interest. For example, as shown in the travel way 700 of FIG. 8, the vehicle 102 can travel in front of an object of interest 702 (e.g., a following vehicle) in a manner that corresponds to the motion of the object of interest 702 (e.g., as shown by motion vector 704). The vehicle control system(s) 108 can control the motion of the vehicle 102 to travel in front of an object of interest 702 (e.g., within the travel lane 706) by maintaining the planned trajectory 708. Additionally, or alternatively, the vehicle control system(s) 108 can modulate the speed of the vehicle 102 to maintain at least a gap 710 (e.g., a distance, headway) between the vehicle 102 and the object of interest 702.

In some implementations, the computing device(s) 106 can identify more than one object of interest and plan the vehicle motion accordingly. This can occur, for instance, in the event the vehicle 102 intends to change travel lanes. By way of example, with reference again to FIG. 2, a travel route 222 of the vehicle 102 can be indicative of a lane change from a current travel lane 204 of the vehicle 106 to another travel lane 206 (e.g., that is different from the current travel lane 204). The computing device(s) 106 can identify at least one object as a first object of interest (e.g., object 202A, object 202B) based at least in part on at least a subset of the data associated with the object of interest (e.g., the state data, the predicted data associated with the object). As shown, the first object of interest (e.g., object 202A, object 202B) can be in the current travel lane 204 of the vehicle

102. The computing device(s) 106 can identify at least one other object (e.g., 202C) as a second object of interest. The second object of interest can be in the other travel lane 206 (e.g., that is different from the current travel lane 204).

The computing device(s) 106 can plan and control the motion of the vehicle 102 based at least in part on the first object of interest and the second object of interest. For example, the computing device(s) 106 can generate a first set of cost data associated with the first object of interest (e.g., object 202A, object 202B). The first set of cost data can be indicative of an effect of controlling a motion of the vehicle 102 such that the vehicle 102 travels behind (or in front of) the first object of interest in a manner that corresponds to a motion of the first object of interest. The computing device(s) 106 can generate a second set of cost data associated with the second object of interest (e.g., object 202C). The second set of cost data can be indicative of an effect of controlling the motion of the vehicle 102 to correspond to a motion of the second object of interest (e.g., object 202C). The computing device(s) 106 can determine a motion plan for the vehicle 102 based at least in part on the first set of cost data associated with the first object of interest and/or the second set of cost data associated with the second object of interest. For example, the motion plan can include a trajectory by which the vehicle 102 is to change lanes behind the object 202A while maintaining a headway and/or distance gap and queue behind the object 202C. The computing device(s) 106 can provide data indicative of the motion plan to the one or more vehicle control systems 108 to implement the motion plan for the vehicle 102. In this way, the motion of the vehicle 102 can be control based on more than one object of interest when it is appropriate (e.g., during a lane change).

Figure 9:
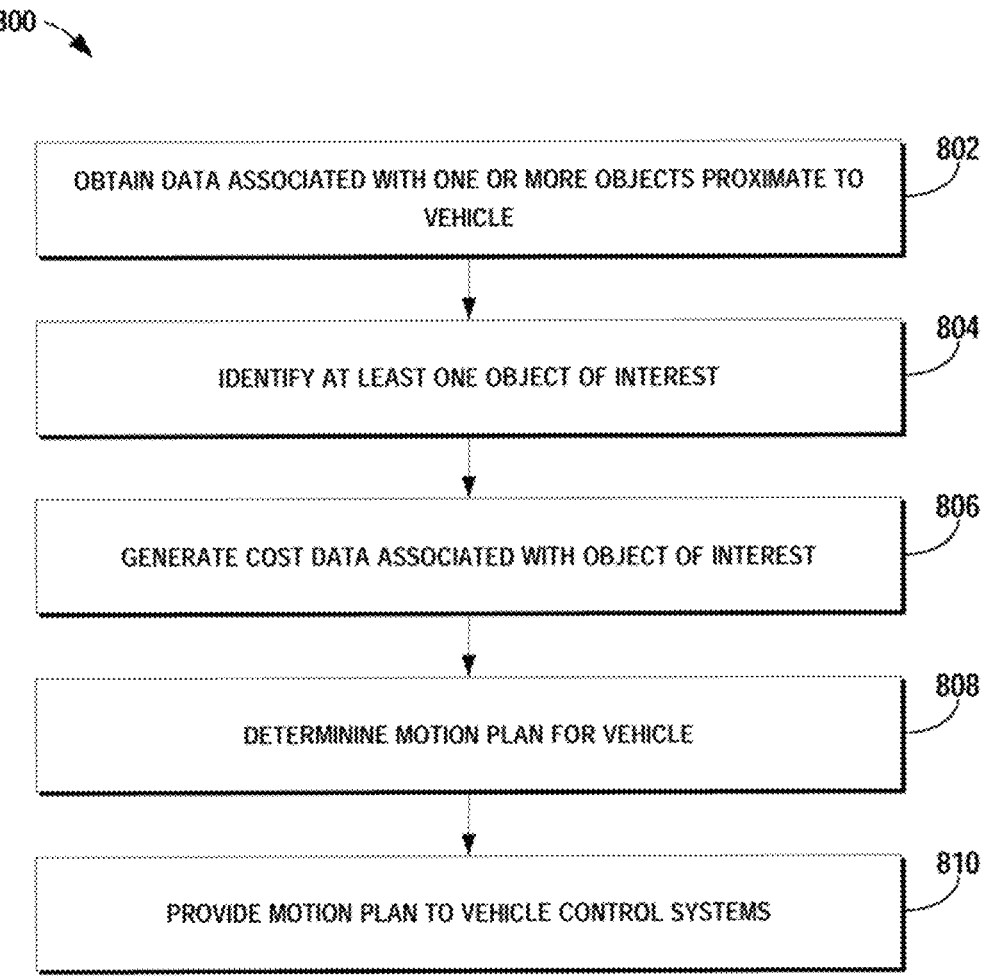
FIG. 9 depicts a flow diagram of an example method of controlling the motion of a vehicle according to example embodiments of the present disclosure.

FIG. 9 depicts a flow diagram of an example method 800 of controlling the motion of an autonomous vehicle according to example embodiments of the present disclosure. One or more portion(s) of the method 800 can be implemented by one or more computing devices such as, for example, the computing device(s) 106. Moreover, one or more portion(s) of the method 800 can be implemented as an algorithm on the hardware components of the device(s) described herein (e.g., as in FIGS. 1 and 10) to, for example, control the motion of a vehicle. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (802), the method 800 can include obtaining data associated with one or more objects proximate to the vehicle. For instance, the computing device(s) 106 on-board the vehicle 102 can obtain data associated with one or more objects that are proximate to the vehicle 102. The data can include state data 122 associated with each respective object within the surrounding environment of the vehicle 102 and/or the predicted data 124 (e.g., a predicted path) associated with each respective object. As described herein, the computing device(s) 106 (e.g., the prediction system 114) can generate the predicted data 124 for each respective object based at least in part on the state data 122. The predicted data 124 associated with an object can include, for example, the predicted path (e.g., trajectory, speed) of that object.

At (804), the method 800 can include identifying at least one object of interest. For instance, the computing device(s) 106 can identify at least one object as an object of interest based at least in part on the data associated with the object of interest (e.g., the state data 122, the predicted data 124) and/or data associated with one or more other objects proximate to the vehicle 102. The computing device(s) 106 can identify the object of interest based on a variety of criteria. By way of example, the travel route of the vehicle 102 can indicate that the vehicle 102 is to travel through an intersection. The predicted path of the object of interest can indicate that the object of interest (e.g., another vehicle) is also to travel through the intersection and/or to merge into a current travel lane of the vehicle 102. As such, the object of interest may be a primary collision risk object for the vehicle 102. The computing device(s) 106 can select the object of interest as most appropriate for planning the vehicle motion accordingly.

At (806), the method 800 can include generating cost data associated with the object of interest. For instance, the computing device(s) 106 can generate cost data 130 associated with the object of interest. As described herein, the cost data 130 is indicative of an effect of controlling a motion of the vehicle 102 such that the vehicle 102 travels (e.g., behind or in front of the object of interest) in a manner that corresponds to a motion of the object of interest. The cost data 130 can be based at least in part on one or more constraints 134. The one or more constraints 134 can include at least one of a headway between the vehicle and the object of interest, a time to a potential collision between the vehicle and the object of interest, and a minimum preferred distance between the vehicle and the object of interest. In some implementations, the cost data 130 can include a cost function that is indicative of a cost of controlling the motion of the vehicle 102 in a manner that corresponds to the motion of the object of interest. One or more inputs of the cost function can include at least a subset of the data associated with the object of interest (e.g., the state data 122, the predicted data 124) and the travel route of the vehicle 102.

At (808), the method 800 can include determining a motion plan for the vehicle. For instance, the computing device(s) 106 can determine a motion plan 132 for the vehicle 102 based at least in part on the cost data 130 associated with the object of interest. The motion plan 132 can include a trajectory by which the vehicle 102 is to travel (e.g., behind the object of interest or a trajectory by which the vehicle 102 is to travel in front of the object of interest). In some implementations, the motion plan 132 can include a distance between the vehicle 102 and the object of interest. The motion plan 132 can be indicative of a modulation of the speed of the vehicle 102 such that the vehicle 102 maintains at least the distance between the vehicle 102 and the object of interest.

At (810), the method 800 can include providing a motion plan to the vehicle control systems. For instance, the computing device(s) 106 can provide data indicative of the motion plan 132 to one or more vehicle control systems 108 to implement the motion plan 132 for the vehicle 102. As described herein, the one or more vehicle control systems 108 can be configured to implement the motion plan 132 to navigate the vehicle 102 in accordance with the motion plan 132. By way of example, the object of interest 602 can include a lead vehicle. The vehicle control systems 108 can implement the motion plan 132 such that the vehicle 102 follows the lead vehicle to travel in a manner that corresponds to the object of interest 602. Moreover, implementation of the motion plan 132 can cause the vehicle 102 to travel in the manner that corresponds to the motion of the object of interest 602 with at least a minimum distance 610 between the vehicle 102 and the object of interest 602.

Figure 10:
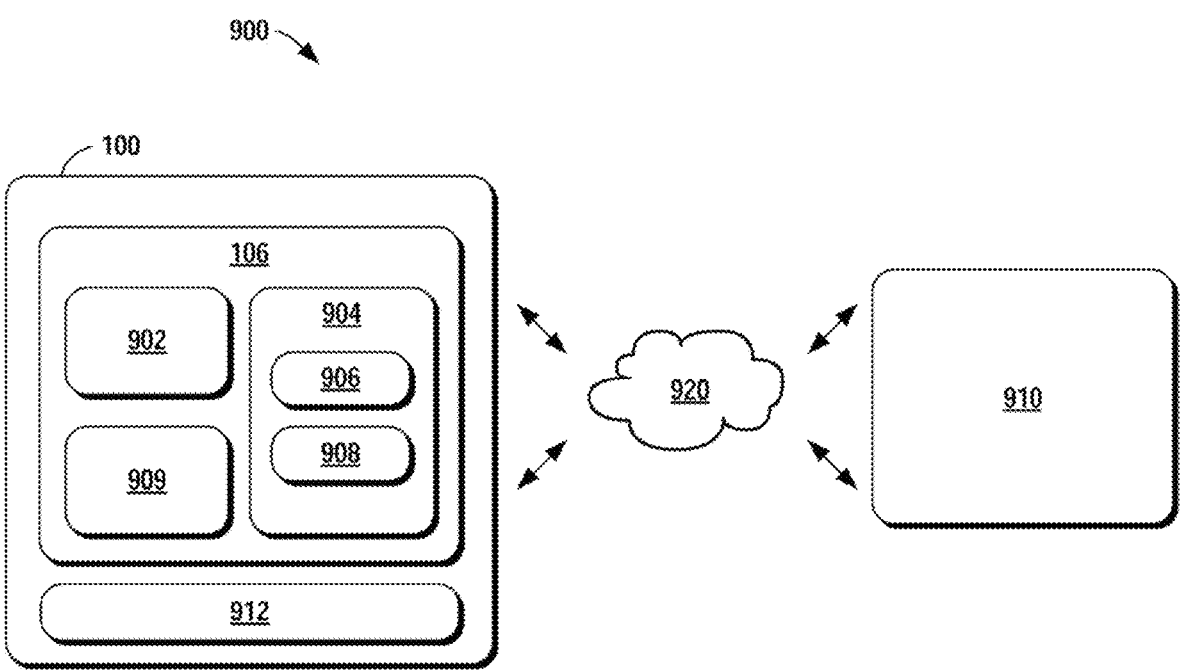
FIG. 10 depicts an example computing system according to example embodiments of the present disclosure.

FIG. 10 depicts an example computing system 900 according to example embodiments of the present disclosure. The example system 900 illustrated in FIG. 10 is provided as an example only. The components, systems, connections, and/or other aspects illustrated in FIG. 10 are optional and are provided as examples of what is possible, but not required, to implement the present disclosure. The example system 900 can include the vehicle computing system 100 of the vehicle 102 and, in some implementations, a remote computing system 910 (e.g., including remote computing device(s)) that is remote from the vehicle 102 that can be communicatively coupled to one another over one or more networks 920. The remote computing system 910 can be associated with a central operations system and/or an entity associated with the vehicle 102 such as, for example, a service provider.

The computing device(s) 106 of the vehicle computing system 100 can include one or more processors 902 and a memory 904. The one or more processors 902 can be any suitable processing device (e.g., a processor core, a microprocessor, an ASIC, a FPGA, a controller, a microcontroller, etc.) and can be one processor or a plurality of processors that are operatively connected. The memory 904 can include one or more non-transitory computer-readable storage mediums, such as RAM, ROM, EEPROM, EPROM, one or more memory devices, flash memory devices, magnetic disks, etc., and combinations thereof.

The memory 904 can store information that can be accessed by the one or more processors 902. For instance, the memory 904 (e.g., one or more non-transitory computer-readable storage mediums, memory devices) on-board the vehicle 102 can include computer-readable instructions 906 that can be executed by the one or more processors 902. The instructions 906 can be software written in any suitable programming language or can be implemented in hardware. Additionally, or alternatively, the instructions 906 can be executed in logically and/or virtually separate threads on processor(s) 902.

For example, the memory 904 on-board the vehicle 102 can store instructions 906 that when executed by the one or more processors 902 on-board the vehicle 102 cause the one or more processors 902 (the computing system 100) to perform operations such as any of the operations and functions of the computing device(s) 106 or for which the computing device(s) 106 are configured, as described herein, the operations for controlling the motion of an autonomous vehicle (e.g., one or more portions of method 800), and/or any other operations or functions for controlling the motion of an autonomous vehicle, as described herein.

The memory 904 can store data 908 that can be retrieved, manipulated, created, and/or stored. The data 908 can include, for instance, sensor data, state data, predicted data, other data associated with one or more objects, cost data, data associated with one or more constraints, data associated with a motion plan, and/or other data/information as described herein. The data 908 can be stored in one or more memory device(s). The one or more memory devices(s) can be split up so that they are located in multiple locales on-board the vehicle 102. In some implementations, the computing device(s) 106 can obtain data from one or more memory device(s) that are remote from the vehicle 102.

The computing device(s) 106 can also include a communication interface 909 used to communicate with one or more other system(s) on-board the vehicle 102 and/or a remote computing device that is remote from the vehicle 102

(e.g., of remote computing system 909). The communication interface 909 can include any suitable components for interfacing with one or more networks (e.g., 920), including for example, transmitters, receivers, ports, controllers, antennas, or other suitable hardware and/or software.

In some implementations, the vehicle computing system 100 can further include a positioning system 912. The positioning system 912 can determine a current geographic location of the vehicle 102. The positioning system 912 can be any device or circuitry for analyzing the position of the vehicle 102. For example, the positioning system 912 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position. The position of the vehicle 102 can be used by various systems of the vehicle computing system 100.

The network(s) 920 can be any type of communications network, such as a local area network (e.g., intranet), wide area network (e.g., Internet), or some combination thereof and can include any number of wired or wireless links. In general, communication over the network(s) 920 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing device(s) remote from the vehicle can instead be performed at the vehicle (e.g., via the vehicle computing system), or vice versa. Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system for controlling autonomous vehicle motion, comprising:
 one or more processors on-board an autonomous vehicle; and one or more memory devices on-board the autonomous vehicle, the one or more memory devices storing instructions are that executable by the one or more processors to cause the computing system to perform operations, the operations comprising:
 obtaining data indicative of an object within an environment of the autonomous vehicle, wherein the object is located within a travel lane;
 generating cost data associated with the object, wherein the cost data is indicative of an effect of the autonomous vehicle merging into the travel lane behind or in front of the object;
 generating based at least in part on the cost data, one or more variables indicative of a speed limit associated with the travel lane in a manner that corresponds to a motion of the object;
 based at least in part on the cost data and the one or more variables, determining one or more parameters associated with a motion planning operation of the autonomous vehicle; and
 causing the autonomous vehicle to implement the one or more parameters associated with the motion planning operation of the autonomous vehicle.

2. The computing system of claim 1, wherein implementation of the one or more parameters causes the autonomous vehicle to merge into the travel lane with at least a minimum distance between the autonomous vehicle and the object located within the travel lane.

3. The computing system of claim 1, wherein the cost data is based at least in part on one or more constraints, and wherein the one or more constraints comprise at least one of: (i) a headway between the autonomous vehicle and the object, or (ii) a time to a potential collision between the autonomous vehicle and the object.

4. The computing system of claim 1, wherein the data indicative of the object within the environment of the autonomous vehicle comprises state data indicative of a current or past state of the object.

5. The computing system of claim 4, wherein the state data comprises a current or past speed, heading, or location of the object.

6. The computing system of claim 1, wherein the data indicative of the object within the environment of the autonomous vehicle comprises a predicted path of the object.

7. The computing system of claim 1, wherein a current travel lane of the autonomous vehicle merges with the travel lane in which the object is located.

8. The computing system of claim 1, wherein the operations further comprise:
 obtaining data indicative of another object within the environment of the autonomous vehicle, wherein the other object is located within a current travel lane of the autonomous vehicle; and
 generating cost data associated with the other object, wherein the cost data is indicative of an effect of the autonomous vehicle travelling behind or in front of the other object in the current travel lane in a manner that corresponds to a motion of the other object.

9. A computer-implemented method comprising:
 obtaining data indicative of an object within an environment of an autonomous vehicle, wherein the object is located within a travel lane;
 generating cost data associated with the object, wherein the cost data is indicative of an effect of the autonomous vehicle merging into the travel lane behind or in front of the object;

generating based at least in part on the cost data, one or more variables indicative of a speed limit associated with the travel lane in a manner that corresponds to a motion of the object;

based at least in part on the cost data and the one or more variables, determining one or more parameters associated with a motion planning operation of the autonomous vehicle; and causing the autonomous vehicle to implement the one or more parameters associated with the motion planning operation of the autonomous vehicle.

10. The computer-implemented method of claim 9, wherein implementation of the one or more parameters causes the autonomous vehicle to merge into the travel lane with at least a minimum distance between the autonomous vehicle and the object located within the travel lane.

11. The computer-implemented method of claim 9, wherein the cost data is based at least in part on one or more constraints, and wherein the one or more constraints comprise at least one of: (i) a headway between the autonomous vehicle and the object, or (ii) a time to a potential collision between the autonomous vehicle and the object.

12. The computer-implemented method of claim 9, wherein the data indicative of the object within the environment of the autonomous vehicle comprises state data indicative of a current or past state of the object.

13. The computer-implemented method of claim 12, wherein the state data comprises a current or past speed, heading, or location of the object.

14. The computer-implemented method of claim 9, wherein the data indicative of the object within the environment of the autonomous vehicle comprises a predicted path of the object.

15. The computer-implemented method of claim 9, wherein a current travel lane of the autonomous vehicle merges with the travel lane in which the object is located.

16. The computer-implemented method of claim 9, further comprising:

obtaining data indicative of another object within the environment of the autonomous vehicle, wherein the other object is located within a current travel lane of the autonomous vehicle; and generating cost data associated with the other object, wherein the cost data is indicative of an effect of the autonomous vehicle travelling behind or in front of the other object in the current travel lane in a manner that corresponds to a motion of the other object.

17. An autonomous vehicle comprising:

one or more processors; and one or more memory devices, the one or more memory devices storing instructions that are executable by the one or more processors to cause the autonomous vehicle to perform operations, the operations comprising:

obtaining data indicative of an object within an environment of the autonomous vehicle, wherein the object is located within a travel lane;

generating cost data associated with the object, wherein the cost data is indicative of an effect of the autonomous vehicle merging into the travel lane behind or in front of the object;

generating based at least in part on the cost data, one or more variables indicative of a speed limit associated with the travel lane in a manner that corresponds to a motion of the object;

based at least in part on the cost data and the one or more variables, determining one or more parameters associated with a motion planning operation of the autonomous vehicle; and causing the autonomous vehicle to implement the one or more parameters associated with the motion planning operation of the autonomous vehicle such that the autonomous vehicle merges into the travel lane.

18. The autonomous vehicle of claim 17, wherein the cost data is based at least in part on one or more constraints, and wherein the one or more constraints comprise at least one of: (i) a headway between the autonomous vehicle and the object, or (ii) a time to a potential collision between the autonomous vehicle and the object.

19. The autonomous vehicle of claim 17, wherein the data indicative of the object within the environment of the autonomous vehicle comprises at least one of: (i) state data indicative of a current or past state of the object, or (ii) a predicted path of the object.

20. The autonomous vehicle of claim 17, wherein the operations further comprise:

generating cost data associated with the other object, wherein the cost data is indicative of an effect of the autonomous vehicle travelling behind or in front of the other object in a current travel lane in a manner that corresponds to a motion of the other object.

* * * * *